United States Patent [19]

Farque

[11] 4,349,774
[45] Sep. 14, 1982

[54] POLARITY MATCHING APPARATUS FOR JUMPER CABLES

[75] Inventor: C. Anthony Farque, Fayetteville, Ark.

[73] Assignee: DFH, Inc., Rogers, Ark.

[21] Appl. No.: 212,078

[22] Filed: Dec. 1, 1980

[51] Int. Cl.$^3$ .............................................. H02J 7/00
[52] U.S. Cl. ................................. 320/25; 307/10 BP; 339/29 B
[58] Field of Search ............... 307/10 BP; 320/25, 26; 339/29 B; 361/245, 246

[56] References Cited

U.S. PATENT DOCUMENTS

| | | | |
|---|---|---|---|
| 3,051,887 | 8/1962 | Lind | 320/25 |
| 3,281,816 | 7/1966 | Raymond | 320/25 |
| 3,308,365 | 3/1967 | St. John | 320/25 |
| 4,166,241 | 8/1979 | Grant | 320/25 |

Primary Examiner—A. D. Pellinen
Attorney, Agent, or Firm—Senniger, Powers, Leavitt and Roedel

[57] ABSTRACT

Apparatus for use with jumper cables, such as in jump starting an engine, which permits attachment of the cables to the terminals of a supply and a battery without regard to the polarities of the terminals, and thereafter aids the user in matching the polarities of the battery and supply. Two terminal blocks, secured to the jumber cables, have at least two spaced contacts apiece and are movable relative to one another between two alternative contact mating positions. The mating positions correspond to the two possible ways in which the battery and supply terminals can be interconnected, either positive-to-positive, negative-to-negative, or positive-to-negative, negative-to-positive. The blocks are biased to a third position in which the battery and supply are not interconnected and in which control circuitry determines which of the two alternative contact mating positions would interconnect the supply and battery with their polarities matched. Movement is prevented to that contact mating position which would re sult in mismatch of the polarities; on movement to the position for which the polarities are matched, the blocks are locked together.

30 Claims, 10 Drawing Figures

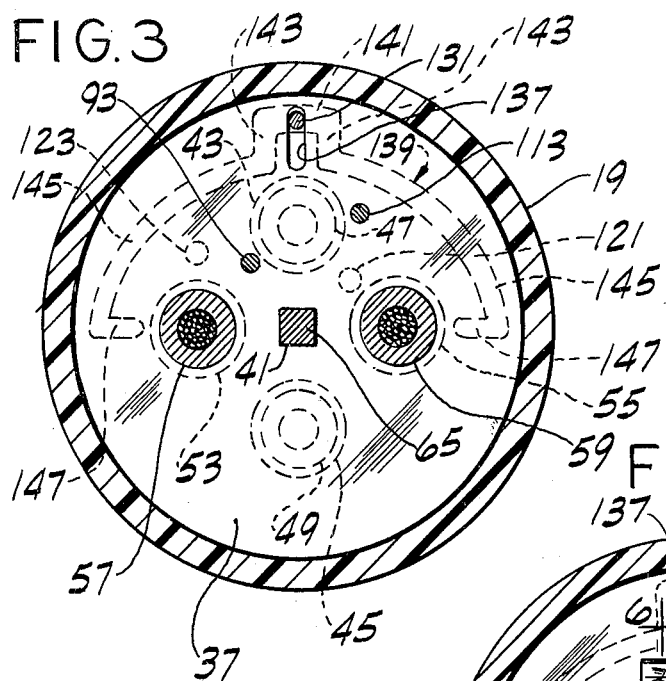
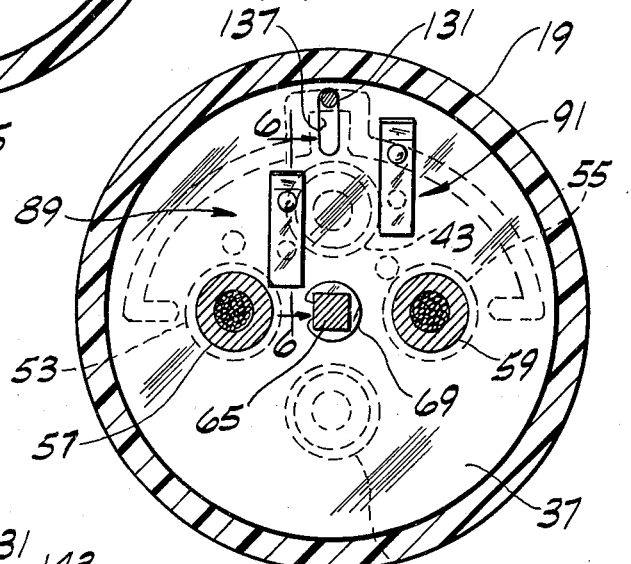
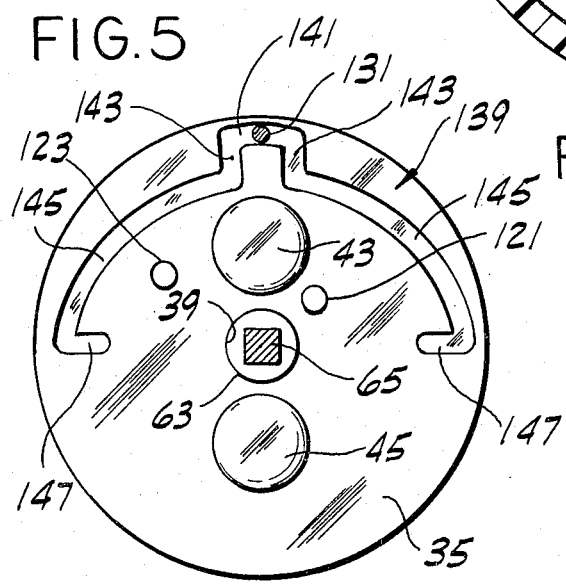
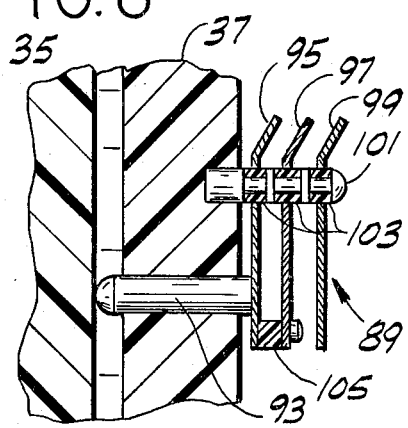

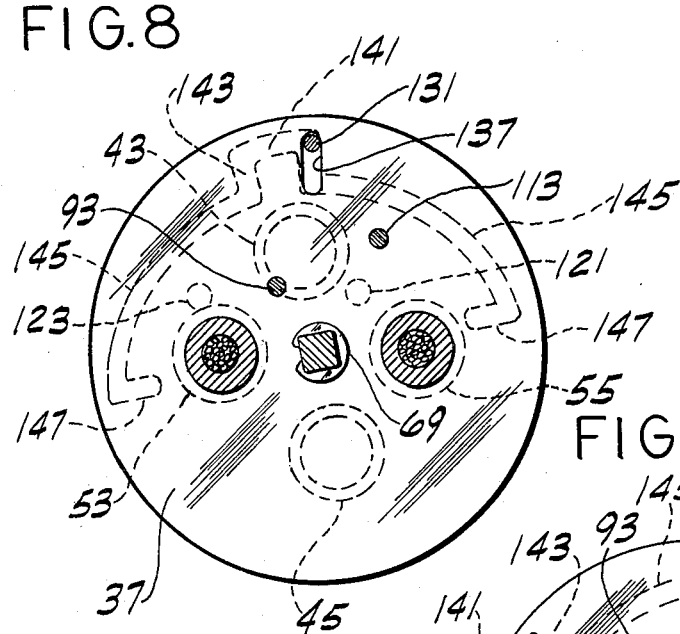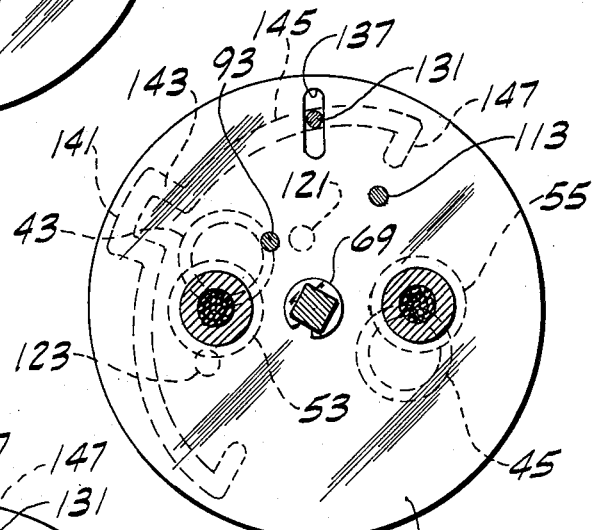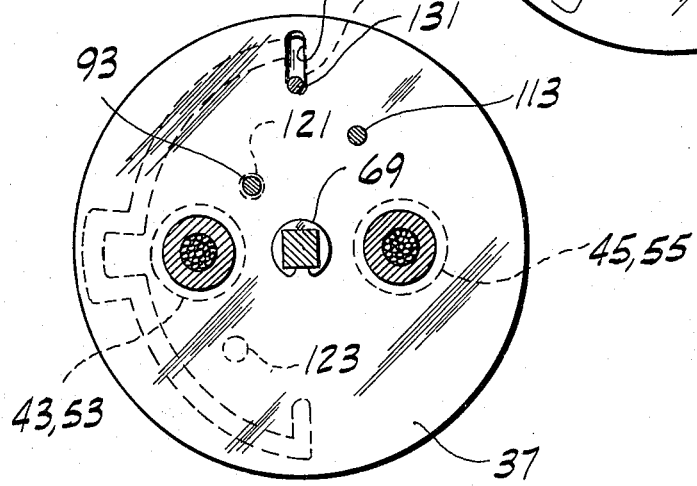

4,349,774

POLARITY MATCHING APPARATUS FOR JUMPER CABLES

BACKGROUND OF THE INVENTION

The present invention relates to interconnecting two supplies of direct current, such as two batteries or a battery charger and a battery, and more specifically to apparatus for insuring that the two supplies are interconnected with their polarities matched (i.e., with the positive terminals of each connected together and with the negative terminals of each connected together).

In connecting a battery to a supply of d.c. power, such as another battery or a battery charger, the battery and supply must be connected with their polarities matched. If the polarities are mismatched, the result will be arcing, extremely large current flow, dangerous overheating of the cables and battery, and possible damage to the battery or supply. When the battery is in an automobile or other vehicle, damage to electrical apparatus of the vehicle could occur.

Apparatus of this invention prevents improper connection of a battery and supply or two batteries. U.S. Pat. Nos. 3,051,887, 3,281,816 and 3,308,365 may be considered in the same general class as the invention, though the apparatus disclosed in these patents require physical reversal of the cable connections at either the supply or battery to prevent or correct a polarity mismatch.

SUMMARY OF THE INVENTION

Among the several objects of the present invention may be noted the provision of improved apparatus for preventing mismatch of polarities when connecting a battery to a direct current supply, such as a battery charger or another battery; the provision of polarity matching apparatus which does not require physical reversal of the cable connections at either the supply or battery; the provision of polarity matching apparatus which, in use, requires no attention to the polarities of the battery and supply when the physical cable connections are made; the provision of polarity matching apparatus which allows interconnection of the battery and supply only when the polarities are matched; and the provision of polarity matching apparatus which locks in the interconnection of the battery and supply when their polarities are matched.

Briefly summarized, polarity matching apparatus of this invention includes two adjacent terminal blocks, each having at least two spaced primary contacts and first and second terminals connected to its primary contacts. In use of the apparatus, the terminals of one block are connected to the terminals of a battery by a jumper cable and the terminals of the other block are connected to the terminals of a supply of direct current by the jumper cable. The two terminal blocks are movable relative to one another between two alternative mating positions of the contacts, the contacts interconnecting the first terminals of the two blocks together and the second terminals of the two blocks together when in one mating position and interconnecting the first terminal of each block to the second terminal of the other block when in the other mating position. The blocks have a third position relative to one another in which the terminal blocks' terminals are not interconnected. A control circuit determines, while the terminal blocks are in their third relative position, which of the two alternative contact mating positions would interconnect the positive terminals of the battery and supply together and the negative terminals of the battery and supply together and thereby match the polarity of the supply to the battery. Other objects and features will be in part apparent and in part pointed out hereinafter.

BRIEF DESCRIPTION OF THE DRAWINGS

FIG. 3 is a section along line 3—3 of FIG. 2 illustrating a portion of the locking mechanism for the two blocks shown in FIG. 2;

FIG. 4 is a section along line 4—4 of FIG. 2, similar to FIG. 3 but also illustrating a pair of auxiliary contact mechanisms mounted on one of the blocks of FIG. 2;

FIG. 5 is a section taken along line 5—5 of FIG. 2 illustrating one of the blocks with the housing removed;

FIG. 6 is a section detail of one of the auxiliary contact mechanisms of FIG. 4;

FIG. 8 is a view similar to FIG. 3 with the housing removed and the blocks rotated relative to one another to a polarity test point in which direction of rotation is sensed;

FIG. 9 is a view similar to FIG. 8 showing the blocks during rotation toward a contact mating position in which contacts on the two terminal blocks are mated; and FIG. 10 is a view similar to FIG. 8 showing the blocks rotated to and locked in a contact mating position.

Corresponding reference characters indicate corresponding parts throughout the several views of the drawings.

DESCRIPTION OF THE PREFERRED EMBODIMENT

Figure 1:
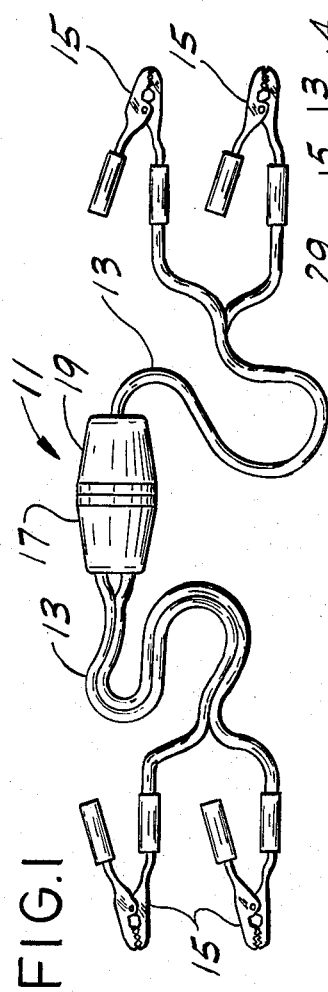
FIG. 1 shows polarity matching apparatus embodying the present invention with conventional jumper cables secured thereto.

The accompanying drawings show a polarity matching apparatus, designated in its entirety by the reference numeral 11, for use with jumper cables 13 of the type used for connecting a supply of direct current to a battery to jump start an engine, charge a battery, or the like. As shown in FIG. 1, battery cables 13 are formed of two conductors each having a battery terminal clamp 15 at its ends to be connected to battery or supply terminals.

Figure 2:
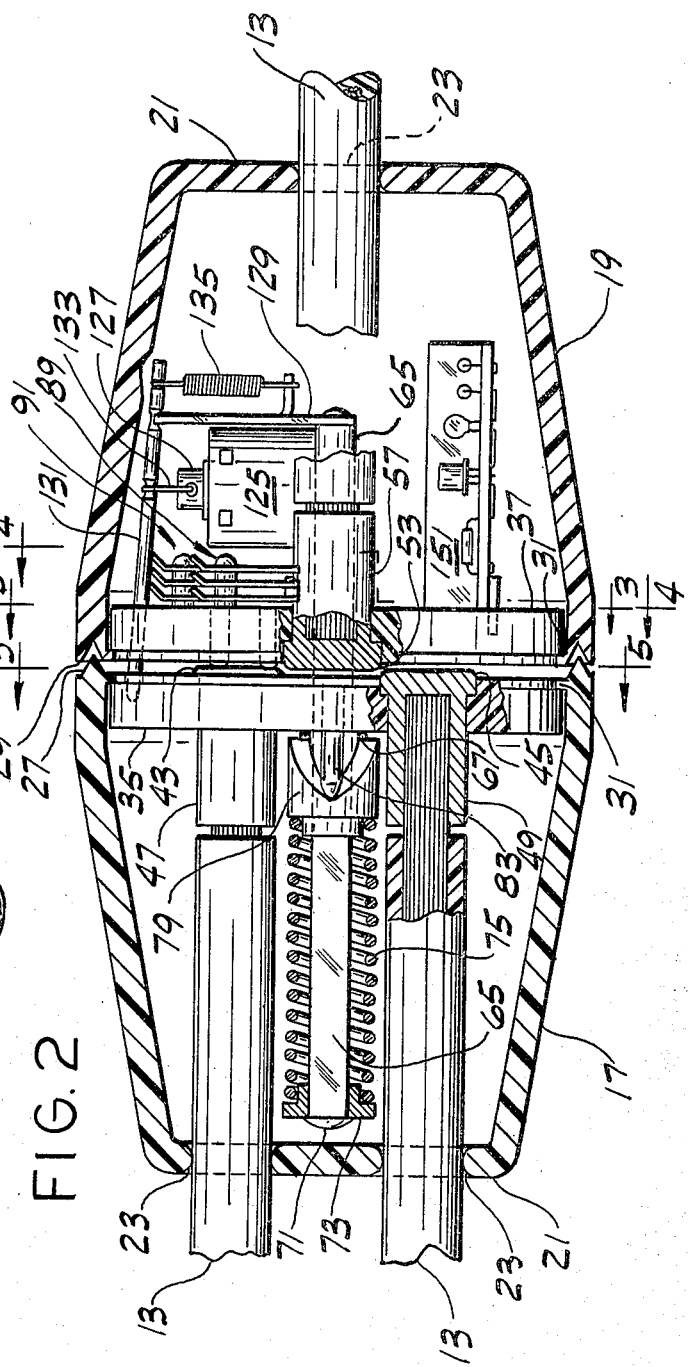
FIG. 2 is a side elevation of the polarity matching apparatus of FIG. 1 with its housing and various parts partially broken away and showing two rotatable terminal blocks.

The polarity matching apparatus includes a housing consisting of first and second housing halves 17, 19 molded of a plastic such as ABS. As shown in FIG. 2, each housing half is a hollow tapered cylinder with an outer, closed end 21 and an open, inner end. The jumper cables pass into the housing through circular openings 23 in each closed end 21. A V-shaped rib 27 on housing half 17 mates in a V-shaped groove 29 in housing half 19. Each housing half has a radially inward flange 31 at its open end.

A first terminal block 35, in the form of a circular plate or disk, is secured in the open end of housing half 17 by flange 31. A second terminal block 37 of similar shape and size is secured in the open end of housing half 19. The two terminal blocks are in adjacent face-to-face relationship, with the first block having a central axial bore 39 (see FIG. 5) and the second block having a smaller central square opening 41 at the axis. Each block is composed of electrically insulating material such as a moldable glass-filled nylon. As shown in FIGS. 1 and 2, the housing surrounds both terminal blocks.

Terminal block 35 has first and second primary electrical contacts 43, 45 on its interior face (i.e., the face adjacent block 37), each being a relatively large circular copper button, as shown in FIG. 5. The two contacts are spaced radially outward of the terminal blocks' axis, are substantially 180° apart, project slightly inwardly of the inner face of the block and extend through the block. Contacts 43, 45 extend outward of the opposite face of block 35 to form corresponding first and second terminals 47, 49. Each terminal is concentrically bored at its outer end to accept the end of a conductor of jumper cable 13 as shown in FIG. 2, the conductor being secured in its terminal in a conventional manner, such as by crimping the terminal. As can be seen in FIG. 2, the housing halves also enclose the terminals.

The second terminal block has similar first and second primary contacts 53, 55 spaced 180° apart, radially outward of the square central opening a distance corresponding to that of the contacts of first block 35. Contacts 53, 55 extend slightly inward of the inner face of the block and on the outer face form first and second terminals 57, 59, which accept ends of the jumper cable conductors.

The first terminal block receives a bushing 63 in its central bore 39, as shown in FIG. 5, the bushing having a square central opening substantially the same size as square opening 41 through second block 37. The two blocks are mounted on a square shaft 65 which extends along the axis through the first block's bushing and the second block's square opening and projects outwardly of both blocks. This permits the two blocks to rotate relative to one another, the first block being rotatable about the shaft and the second block being fixed with respect to the shaft. A retaining ring 67 for the first block is provided on the shaft at the outer face of the block; a similar retaining ring 69 at the outer face of the second block may be seen in FIG. 4.

At its end outward of block 35, shaft 65 has a flared head 71 which secures a shouldered keeper 73 on the shaft, as shown in FIG. 2. A coil spring 75 is carried on the shaft outwards of the rotatable first block and extends inward from keeper 73 to the shoulder of a generally cylindrical centering ram 79 which is mounted on the shaft between the spring and rotatable block (see FIG. 2). The cam has a square central opening by which it is mounted on the shaft for axial sliding; the cam rotates with the shaft and second block 37 relative to first block 35. A cam follower 83 is mounted on the rotatable first block, which follower consists of a pointed pin positioned to project perpendicularly from the outer surface of the block to the sloped camming surface of cam 79 and to engage the deepest part of the cam when the primary contacts of the two blocks are spaced 90° apart. This general relative position of the blocks is hereinafter referred to as their intermediate (or third) relative position. Spring 75 is in compression at the intermediate relative position of the blocks and subject to greater compression by the cam and follower on departure from the intermediate position in either sense, which causes the blocks to be spring-biased to the center of the intermediate relative position.

The two blocks are rotatable relative to each other about their axis in either sense from the intermediate position. Rotation of approximately 90° in one direction causes first contacts 43, 53 of the two blocks to contact each other, interconnecting first terminals 47, 57 of the two blocks together, and second contacts 45, 55 of the two blocks to contact each other, interconnecting second terminals 49, 59 of the two blocks together. On the other hand, relative rotation in the opposite sense causes first contact 43, 53 of each block to contact second contact 45, 55 of the other block thereby interconnecting the first terminal of each block to the second terminal of the other block. These two 180° spaced-apart positions of the blocks are alternative mating positions of the primary contacts. Relative rotation of housing halves 17, 19 rotates blocks 35, 37 toward the alternative mating positions. When the apparatus is not in use, the two blocks are biased by the spring and cam-follower arrangement to their intermediate relative position in which none of the primary contacts mate and the terminals are not interconnected.

Coil spring 75 further serves to maintain the two terminal block plates in face-to-face relationship for mating of the primary contacts on rotation to either of the mating positions.

Two sets of auxiliary contacts or switches, generally designated 89 and 91 (see FIGS. 2, 4 and 6), are mounted on second block 37. Referring particularly to switch 89, a brass actuating pin 93 (see FIG. 6) is slidably engaged in a bore through the second block perpendicularly to the faces of the block. The bore is positioned such that on initiation of rotation from the center of the intermediate relative position of the blocks, pin 93 contacts first contact 43 projecting inwardly from first block 35 and is cammed away from the first block. When so rotated within the range of the intermediate position, the blocks are at a polarity test point. As shown in FIG. 6, first auxiliary switch 89 includes a set of three face-to-face conductive brass spring blades 95, 97, 99 mounted on the outer side of the second block by a mounting pin 101 at one end of the blades with insulating spacers 103 about the pin sandwiched between the blades. The free end of inner blade 95 extends over the bore of the actuating pin to contain the pin within the bore and is separated from the middle blade 97 at its free end by another insulator 105. On initiation of rotation of the blocks in their intermediate position from the center of the intermediate position, actuating pin 93 completes a circuit between first contact 43 of the first block and inner spring blade 95 and at the same time drives middle blade 97 outward to contact outer blade 99.

Figure 7:
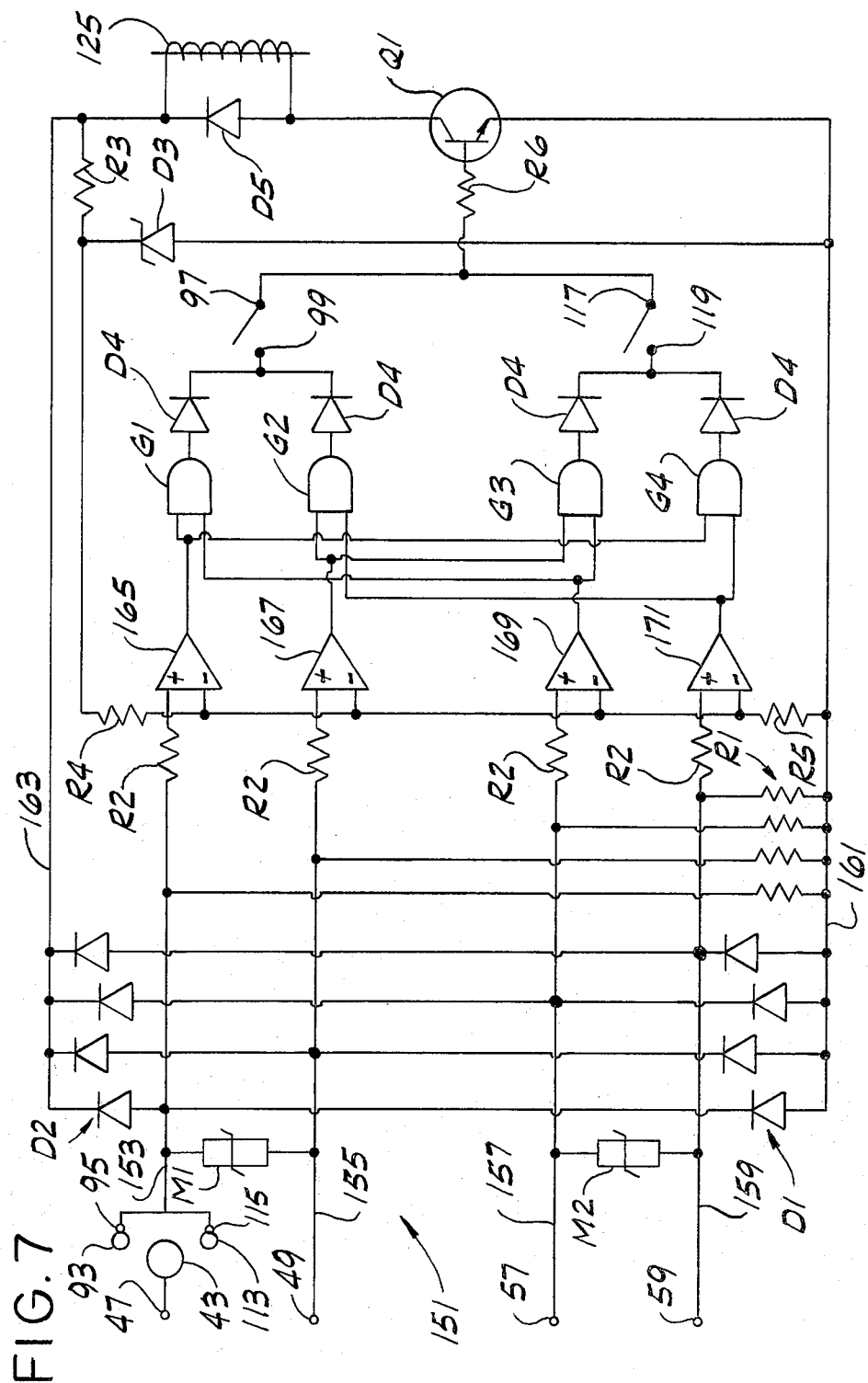
FIG. 7 is a wiring schematic for the polarity matching apparatus.

The second auxiliary switch is identical to first switch 89 and its parts are correspondingly designated, except the corresponding actuating pin is designated 113 and the spring blades are designated 115, 117 and 119 on the wiring schematic of FIG. 7. The bore and actuating pin 113 therein are positioned such that on initiation of rotation of the blocks at the intermediate relative position in the opposite sense as for first switch 89, pin 113 is cammed away from the first block when the opposite polarity test point is reached.

The two actuating pins are different distances away from the axis of the blocks; that is, actuating pin 93 is offset radially inward with respect to actuating pin 113.

It is also necessary to cam the actuating pins when the blocks are in either of the contact mating positions. To do this the first block is provided with two integrally formed lugs 121, 123 (see FIG. 5) on opposite sides of first contact 43, likewise radially offset amounts corresponding to the offsets of their respective actuating pins 93, 113.

A solenoid 125 is mounted on shaft 65 outward of and in fixed position with respect to second block 37 with a solenoid armature 127 extending generally radially outward, as shown in FIG. 2. A bracket 129 is mounted at the end of the shaft and extends radially to provide a fulcrum for a pivotable finger 131 which extends generally parallel to the shaft outward of the solenoid armature. The finger is controllable by the solenoid via a wire loop 113. Loop 133 is coupled to the armature and around the finger between the block and fulcrum to pivot the finger and draw the inner end of the finger radially inward when the armature is retracted. A spring 135 between the bracket and finger outward of the fulcrum biases the inner end of the finger radially outward.

The inner end of finger 131 extends through a slot or opening 137 in second block 37 (to which the solenoid is fixed), which slot extends generally radially relative to the axis, as shown in FIG. 3. The finger extends into an elongate recess, generally designated 139, (see FIG. 5) in the inner surface of first block 35, by which one terminal block is detachably secured to the other to limit or prevent their relative movement. When the two blocks are in their intermediate relative position, as in FIGS. 3 and 4, the recess extends in two places (e.g., in opposite directions) from the perimeter of slot 137.

The recess has a first portion 141 which is generally perpendicular to a radius of the blocks through the radial slot when the blocks are at the center of their intermediate position (FIGS. 3 and 4), first portion 141 extending on either side of center a sufficient distance to permit sufficient rotation of the blocks in either direction, with the finger extending through slot 137 into the first portion, for either of the actuating pins 93, 113 to contact first contact 43 of first block 35 (the polarity test point shown in FIG. 8). First recess portion 141 is in registration with the outer end of slot 137 when the blocks are in their intermediate position. Finger 131 contacting the ends of first recess portion 141 prevents relative rotation to that contact mating position which would interconnect the block's terminals with the polarities of the supply and battery mismatched.

Two second recess portions 143 extend from the ends of first portion 141 radially inward a distance substantially corresponding to the inward extent of slot 137, to permit inward pivoting of finger 131 in the slot by the solenoid when the blocks are at one of the polarity test points (FIG. 8). From the radially inward end of each second portion 143, a third portion 145 extends outward generally in an arc about the axis of the blocks to permit the blocks to depart from the polarity test point of their intermediate relative position (as shown in FIG. 9) and rotate to one of the contact mating positions on pivoting of the finger radially inward away fromm the end of first portion 141. Third portions 145 increase in their spacing from the axis as they extend outwardly from second portion 143, and end, approximately 90° from the center of first portion 141, spaced radially from the axis substantially the same distance as the outer end of slot 137. Finally, two fourth recess portions 147 are provided, each extending radially inward away from the outer end of one of the third portions 145 for a distance substantially corresponding to the inward extent of slot 137. The fourth portions 147, spaced substantially 90° from slot 137 when the blocks are in the center of their intermediate position, permit finger 131 to pivot radially inward away from the outer end of third portion 145 to lock the blocks against rotation while in one of the contact mating positions, as shown in FIG. 10.

A control circuit module, generally designated 151, is mounted to the outer side of second terminal block 37. Referring to FIG. 7, the control circuit includes a first input line 153 connected to inner spring blades 95, 115 of auxiliary contact mechanisms 89, 91. Line 153 is therefore connected to first terminal 47 of first terminal block 37 when the blocks are rotated in the intermediate position to one of the polarity test points, since at either of these points auxiliary contact pin 93 or 113 contacts contact 43 of the first terminal block. Second, third, and fourth input lines 155, 157, 159 are connected to second terminal 49 of the first terminal block and first and second terminals 57, 59 of the second terminal block, respectively. For transient protection, the first and second inputs lines are connected by a metal oxide varistor M1 and the third and fourth input lines are connected by another varistor M2.

The four input lines are tied by four diodes D1 to a common line 161 and are tied by four other diodes D2 to an unregulated supply line 163, forming a bridge arrangement which provides an unregulated voltage generally in the range of that of the battery and supply. The four input lines are also tied to the common line by four referencing resistors R1.

First input line 153 is connected by an input resistor R2 to the noninverting input of a first operational amplifier (op amp) 165 serving as a voltage comparator. Likewise, second, third and fourth input lines 155, 157, 159 are connected through resistors R2 to the noninverting inputs of second, third and fourth op amp comparators 167, 169, 171.

A dropping resistor R3 ties unregulated supply line 163 to the cathode of a 5 V zener diode D3, whose anode is connected to common line 161. A pair of voltage divider resistors R4, R5 connect the cathode of the zener diode to common, providing a threshold voltage less than the voltage of that terminal block terminal having the highest potential (typically the terminal connected to the positive terminal of the supply) and also less than the voltage of that terminal block terminal having the next highest potential (typically the terminal connected to the positive terminal of the battery to be boosted). The threshold voltage is supplied to the inverting inputs of each of the op amp comparators, and is selected to be generally less than the battery voltage. In the preferred embodiment the threshold voltage is approximately 100 mV. Each voltage comparator compares the voltage at a terminal block terminal (on one of the input lines) with the threshold voltage and provides a High output if the terminal is positive and over 100 mV and a Low output if the terminal is negative or less than 100 mV. This distinguishes which two of the terminals are negative and which two of the terminals are positive.

Four two-input logical AND gates G1, G2, G3, G4 are provided, gate G1 having its two inputs connected to the outputs of comparators 165, 169. Gate G2 is similarly connected to comparators 167, 171, and together with gate G1 constitutes a first pair of logic gates. AND gates G3, G4 constitute a second such pair. Gates G3's inputs are connected to comparators 167, 169 and gate G4's inputs are connected to comparators 165, 171. The AND gates form a logic circuit responsive to the comparators and auxiliary contacts for determing whether the contact mating position toward which movement is initiated will result in the interconnection of two positive terminals.

Since each AND gate is connected to a different combination of two of the voltage comparators, each represents a different combination of terminals. The output of each gate signifies whether its respective terminals are both positive. The output of gate G1, for example, is a logic High only when terminals 47 and 57 are both positive and when this condition exists, none of the other gates have a High output. Likewise the output of gate G2 is High when terminals 49 and 59 are positive, etc. Each pair of gates corresponds to a different one of the contact mating positions. The outputs of the gates corresponding to each contact mating position indicate whether the polarities of the supply and battery would be matched for that contact mating position. That is, when the outputs of one of the gates of a pair is positive that signifies that the polarities wold be matched in the corresponding mating position.

The outputs of the first pair of AND gates G1, G2 are tied together through diodes D4 to outer spring blade 99 of the first auxiliary contact mechanism 89 and the outputs of the second pair of AND gates G3, G4 are tied together through diodes D4 to outer spring blade 119 of the second auxiliary contact mechanism 91. The auxiliary contact mechanisms serve as means for sensing, on initiation of relative movement of the blocks toward either contact mating position, which of the two mating positions the terminal blocks are being moved toward. The second spring blades 97, 117 of the two auxiliary contact mechanisms are connected together and to the base of an npn power transistor Q1 through a base resistor R6. The emitter of the transistor is connected to common line 161 and the collector is connected to unregulated supply line 163 through the winding of solenoid 125, with the result that the solenoid is responsive to and controlled by the control circuit. A diode D5 is provided in parallel with the solenoid winding to dissipate the energy of the inductive field in the solenoid winding when the transistor is switched off.

When using polarity matching apparatus 11 with jumper cables 13 for connecting a supply (such as a fully charged battery) to another battery to jump start an engine, for example, the user need not give any attention to the relative polarities of the battery and supply. First, clamps 15 at one end of cable 13 are secured to the terminals of the battery and clamps 15 at the other end of cable 13 are secured to the terminals of the supply, which connects the battery and supply terminals to the terminals of terminal blocks 35 and 37. Because the two terminal blocks are spring biased to their intermediate relative position before the cables are connected to the battery and supply, the battery and supply are not interconnected by the cables.

In order to interconnect the battery and supply, the user grasps housing valves 17, 19 and rotates them relative to one another in either sense against the spring bias, causing corresponding relative rotation of the two terminal blocks. Initial rotation will be within the intermediate position of the blocks, limited by the solenoid-controlled finger 131 to travel from the center to one end of first recess portion 141 in the face of the first block. As the finger reaches the end of the first recess portion (the polarity test point shown in FIG. 8), one of the auxiliary contact pins contacts first contact 43 of first terminal block 35 and is cammed away from the first block, interconnecting first contact 43 to first input line 153 of the control circuit via the corresponding inner spring blade 95, 115 and causing the center and outer spring blades to close (97 and 99, or 117 and 119). At this time the control circuit is actuated for determining, while the terminal blocks are at the polarity test point in their intermediate relative position, whether rotation of the blocks in the sense to which rotation has been initiated (and thus which of the two alternative mating positions) would interconnect the positive terminals of the battery and supply together and the negative terminals of the battery and supply together and thereby match the polarity of the supply to the battery.

Stated another way, the outputs of gates G1, G2, G3 and G4 represent the possible connections of the positive terminals of the battery and supply. The outputs of gates G1, G2 are connected by the closing of the circuit between blades 97 and 99 to transistor Q1 on relative rotation of the two blocks in that sense which would connect first contacts 43, 53 of the two blocks and second contacts 45, 55 of the two blocks.

Similarly, the outputs of AND gates G3, G4 are connected, by the closing of the circuit between blades 117 and 119, to Q1 on relative rotation in the opposite sense, that is, that which would connect first contact 47, 57 of each block to second contact 49, 59 of the other block. Thus, the auxiliary contacts select the outputs of that pair of AND gates corresponding to the contact mating position to which rotation is initiated.

A High input of one AND gate of the pair selected by the auxiliary switch contacts causes Q1 to conduct and actuate solenoid 125. If neither AND gate of the selected pair is High, the sense of rotation is wrong and the solenoid will not be actuated. As a result, return spring 135 will hold finger 131 at the outer end of slot 137 (the FIG. 8 position) and thereby prevent further rotation in the wrong sense. Thus, solenoid-controlled finger 131 and recess 139 constitute means responsive to the control circuit, for preventing relative movement of the terminal blocks to that contact mating position which would interconnect the terminals with the polarities of the supply and battery mismatched. Where the blocks are first rotated in the wrong sense, they should be rotated in the opposite sense to the other polarity test point.

Assuming rotation has been initiated in the correct direction, the solenoid is actuated. Actuation of solenoid 125 pulls in its armature 127 and draws wire loop 133 radially inward, pivoting finger 131 to draw its inner end radially inward through second recess portion 143, thereby releasing the terminal blocks to permit their relative rotation. When the finger has reached the inner end of portion 143, the two housing halves (still held by the user against the bias of coil spring 75) are further rotated by the user in the same sense, with the finger's inner end traveling in third recess portion 145 (FIG. 9) toward that contact mating position in which the polarities would be matched. Finger 131 is moved radially outward in slot 137 during this rotation because of the gradual increase in the spacing of portion 145 from the axis as the finger moves away from second portion 143. Upon the finger's inner end reaching the outer end of third portion 145, the appropriate lug 121, 123 cams the corresponding actuating pin 93, 113 outward. The solenoid is then energized to pivot the inner end of the finger radially inward in fourth recess portion 147, thereby locking the two blocks in that contact mating position in which the polarities of the supply and battery are matched, responsive to the control circuit. At this position, shown in FIG. 10, the user need no longer hold the two housing halves against the bias of spring 75; they are locked.

Once the engine has started (or the battery charged, etc.) the jumper cables are unclamped from the battery and supply. After the clamps are removed from the terminals, the control circuit no longer has power and solenoid 125 is de-energized. Once this happens, the inner end of finger 131 is pivoted outward by return spring 135 to unlock the two blocks. Thus, solenoid 125 and finger 131 constitutes means for unlocking the terminal blocks upon the circuit to the battery and supply being broken. The inner end of the finger then travels through the fourth, third and second recess portions 147, 145, 143, respectively, back to first portion 141, the rotation of the blocks being caused by the bias of the spring, cam and follower arrangement. That is, spring 75, cam 79 and follower 83 constitute means for rotating the terminal blocks back to the center of their intermediate relative position upon removal of the clamps from the terminals of the battery and supply. These elements bias the two blocks to the center of their intermediate relative position with the finger at the center of the first recess portion. The polarity matching apparatus is then ready for its next use.

Alternative arrangements of the terminal blocks are within the scope of the invention. For example, the two terminal blocks may be movable relative to one another by sliding (as opposed to rotating) between two contact mating positions, with each block having at least two spaced primary contacts connected to its two terminals, the blocks having a third position in which the terminals are not interconnected by the contacts.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Polarity matching apparatus for use with jumper cables in connecting a supply of direct current to a battery to jump start an engine or the like, comprising:
   two adjacent terminal blocks, each terminal block having at least two spaced primary contacts and first and second terminals connected to its primary contacts, in use of the apparatus the terminals of one block being connected to the battery terminals by a jumper cable and the terminals of the other block being connected to the supply terminals by the jumper cable;
   the two terminal blocks being movable relative to one another between two alternative mating positions of the contacts, the contacts interconnecting the first terminals of the two blocks together and the second terminals of the two blocks together when in one mating position and interconnecting the first terminal of each block to the second terminal of the other block when in the other mating position, the blocks having a third position relative to one another in which the terminal blocks' terminals are not interconnected; and
   control circuit means for determining, while the terminal blocks are in their third relative position, which of the two alternative contact mating positions would interconnect the positive terminals of the battery and supply together and the negative terminals of the battery and supply together and thereby match the polarity of the supply to the battery.

2. The polarity matching apparatus as set forth in claim 1 further comprising means, responsive to the control circuit means, for preventing relative movement of the blocks to that contact mating position which would interconnect the terminals with the polarities of the supply and battery mismatched.

3. The polarity matching apparatus as set forth in claim 1 further comprising means for biasing the two blocks to their third relative position.

4. The polarity matching apparatus as set forth in claim 3 further comprising means, responsive to the control circuit means, for locking the two blocks in that contact mating position in which the polarities of the supply and battery are matched.

5. The polarity matching apparatus as set forth in claim 4 wherein the locking means includes a solenoid responsive to the control circuit means and a finger controllable by the solenoid to detachably secure one terminal block to the other and thereby prevent their relative movement.

6. The polarity matching apparatus as set forth in claim 4 wherein the locking means includes means for preventing relative movement of the blocks to that contact mating position which would interconnect the blocks' terminals with the polarities of the supply and battery mismatched.

7. The polarity matching apparatus as set forth in claim 1 wherein the control circuit means includes:
   means for establishing a threshold voltage less than the voltage of that terminal block terminal having the highest potential and less than the voltage of that terminal block terminal having the next highest potential, the threshold voltage being selected to be generally less than the battery voltage; and
   four voltage comparators, one connected to each of the four terminal block terminals, each comparator comparing the voltage at a terminal block terminal with the threshold voltage, thereby to distinguish which two of the terminals are negative and which two of the terminals are positive.

8. The polarity matching apparatus as set forth in claim 7 wherein the control circuit means further includes:
   means for sensing, on the initiation of relative movement of the two terminal blocks toward either contact mating position, which of the two contact mating positions the terminal block is being moved toward; and
   logic circuit means, responsive to the comparators and sensing means, for determining whether the contact mating position toward which movement is initiated will result in the interconnection of two positive terminals.

9. The polarity matching apparatus as set forth in claim 8 further comprising means, responsive to the logic circuit means, for preventing further relative movement of the blocks toward that contact mating position to which movement is initiated when that contact mating position would interconnect the terminals with the polarities of the supply and battery mismatched.

10. Polarity matching apparatus for use with jumper cables in connecting a supply of direct current to a battery to jump start an engine or the like, comprising:

two adjacent terminal blocks rotatable relative to each other on about axis, each block having two primary contacts mounted thereon radially outward of the axis and spaced substantially 180° apart, each block having two terminals, one terminal being connected to one of the primary contacts of its block and the other being connected to the other primary contact of its block, in use of the apparatus the terminals of one block being connected to the battery terminals by a jumper cable and the terminals of the other block to the supply terminals by the jumper cable, the two terminal blocks being rotatable relative to one another about their axis between two opposite positions for alternative mating of the two primary contacts of one block with the two primary contacts of the other block, the blocks having an intermediate relative position in which none of the primary contacts are mated;

means for biasing the two blocks to their intermediate position;

control circuit means for determining, while the terminal blocks are in their intermediate relative position, which of the alternative mating positions of the contacts will result in interconnecting the terminals of the two blocks to match the polarity of the supply to the battery; and means, responsive to the control circuit means, for preventing relative rotation of the blocks to that contact mating position in which the polarities of the supply and battery would be mismatched and for locking the two blocks in that contact mating position in which the polarities of the supply and battery are matched.

11. The polarity matching apparatus as set forth in claim 10 further comprising a shaft extending along the axis of the blocks, one terminal block being fixed with respect to the shaft and the other block being rotatable about the shaft, and wherein the biasing means includes a spring associated with the shaft and the rotatable terminal block.

12. The polarity matching apparatus as set forth in claim 11 wherein the shaft extends through the rotatable block, wherein the spring is a coil spring carried on the shaft outward of the rotatable block, the shaft having a keeper for the spring adjacent the outer end of the shaft.

13. The polarity matching apparatus as set forth in claim 12 wherein the biasing means includes a centering cam on the shaft between the spring and rotatable block and a cam follower on the rotatable block, the spring being in compression at the intermediate relative position of the blocks and subject to greater compression by the cam and follower on departure from the intermediate position in either sense, whereby the blocks are spring biased to their intermediate relative position.

14. The polarity matching apparatus as set forth in claim 10 wherein each terminal block comprises a plate generally perpendicular to the axis of the blocks, the two terminal block plates being in face-to-face relationship with the primary contacts of the two plates on their adjacent faces and the corresponding terminals on their opposite faces.

15. The polarity matching apparatus as set forth in claim 14 wherein the biasing means comprises a coil spring which maintains the two plates in the face-to-face relationship for mating of the primary contacts on rotation on either of the mating positions.

16. The polarity matching apparatus as set forth in claim 10 further comprising two housing halves, each half mounted to one of the terminal blocks and enclosing the terminals of its terminal block, the housing halves together forming a housing around both terminal blocks.

17. The polarity matching apparatus as set forth in claim 10 wherein the preventing means includes:

a solenoid responsive to the control circuit means and mounted in fixed position with respect to one of the terminal blocks;

an opening through that terminal block to which the solenoid is fixed;

a recess in the surface of the other terminal block; and a finger controllable by the solenoid and adapted to extend through the opening into the recess for limiting relative movement of the terminal blocks.

18. The polarity matching apparatus as set forth in claim 17 wherein the recess is elongate and extends in two places from the perimeter of the opening when the two blocks are in their intermediate relative position.

19. The polarity matching apparatus as set forth in claim 18 wherein the elongate recess has a first portion generally perpendicular to a radius of the blocks the ends of the first portion preventing rotation from the intermediate position.

20. The polarity matching apparatus as set forth in claim 19 wherein the opening comprises a slot extending generally radially relative to the axis, the finger is adapted to be pivoted in the slot by the solenoid, and the elongate recess has two second portions, each extending generally radially from an end of the first portion to permit pivoting of the finger.

21. The polarity matching apparatus as set forth in claim 20 wherein the elongate recess comprises two third portions each extending outward from the radial ends of one of the second portions generally in an arc about the axis to permit the blocks to depart from their intermediate relative positions and rotate to one of the contact mating positions on pivoting of the finger radially away from the ends of the first portion.

22. The polarity matching apparatus as set forth in claim 21 wherein the elongate recess comprises two fourth portions each extending generally radially from the outward end of one of the third portions, to permit pivoting of the finger radially away from the outer ends of the third portion to lock the blocks in one of the contact mating positions.

23. The polarity matching apparatus as set forth in claim 22 wherein the finger is drawn radially inward by the solenoid when the blocks are rotated in their intermediate position toward that contact mating position for which the polarities would be matched, and wherein the second recess portions extend inward from the ends of the first recess portion a distance corresponding to the inward extent of the slot and the fourth recess portions extend inward from the ends of the third recess portion corresponding to the inward extent of the slot.

24. The polarity matching apparatus as set forth in claim 17 wherein the recess comprises two portions each spaced substantially 90° from the opening when the blocks are in the intermediate positions, each of the two portions being adapted to receive the finger to lock the two blocks in a contact mating position.

25. The polarity matching apparatus as set forth in claim 10 wherein the control circuit means includes two sets of auxiliary contacts mounted on one of the terminal blocks, means for actuating one set of contacts on relative rotation of the blocks in their intermediate position in one sense and means for actuating the other set of contacts on relative rotation in the opposite sense.

26. The polarity matching apparatus as set forth in claim 25 wherein the actuating means for each set of auxiliary contacts comprises a pin slidably engaged through a bore in that terminal block to which its set of auxiliary contacts is mounted, each pin being adapted to be cammed axially to actuate its set of auxiliary contacts by a primary contact of the other terminal block on initiation of relative rotation of the blocks.

27. The polarity matching apparatus as set forth in claim 25 wherein the control circuit includes:

means for establishing a threshold voltage less than the voltage of that terminal block terminal having the highest potential and less than the voltage of that terminal block terminal having the next highest potential, the threshold voltage being selected to be generally less than the battery voltage; and four voltage comparators, one connected to each of the four terminal block terminals, each comparator comparing the voltage at a terminal block terminal with the threshold voltage, thereby to distinguish which two of the terminals are negative and which two of the terminals are positive; and logic circuit means, responsive to the comparators and auxiliary contacts, for determining whether the contact mating position toward which movement is initiated will result in the interconnection of two positive terminals.

28. The polarity matching apparatus as set forth in claim 27 wherein the logic circuit means includes two pairs of logic gates, each logic gate being connected to a different combination of two of the voltage comparators, one gate of each pair being connected to two comparators corresponding to two block terminals which would be interconnected in a contact mating position, and the other gate of that pair being connected to the two comparators corresponding to the other two terminals, each pair of gates corresponding to a different one of the contact mating positions, whereby the outputs of the gates corresponding to each contact mating position indicate whether the polarities of the supply and battery would be matched for that contact mating position, the sets of auxiliary contacts being connected to select the outputs of that pair of gates corresponding to the contact mating position to which rotation is initiated.

29. The polarity matching apparatus as set forth in claim 28 wherein the preventing means comprises a solenoid responsive to the pair of gates selected by the auxiliary contacts and a finger controllable by the solenoid to detachably secure one terminal block to the other, the solenoid operating to release the terminal blocks to permit their relative rotation when movement is initiated toward that contact mating position which would result in the interconnection of two positive terminals.

30. The polarity matching apparatus as set forth in claim 10 further including means for unlocking the terminal blocks upon the circuit to the battery and supply being broken and means for rotating the terminal blocks to their intermediate relative position when the blocks are unlocked, whereby connection between the terminals of the terminal blocks is automatically broken after use of the apparatus.

* * * * *